May 19, 1931.   T. J. FEGLEY ET AL   1,806,528
PORTABLE POWER DRIVEN SAW
Filed Jan. 29, 1930   5 Sheets-Sheet 1

Inventors:
Thomas J. Fegley
George O. Leopold
by their Attorneys

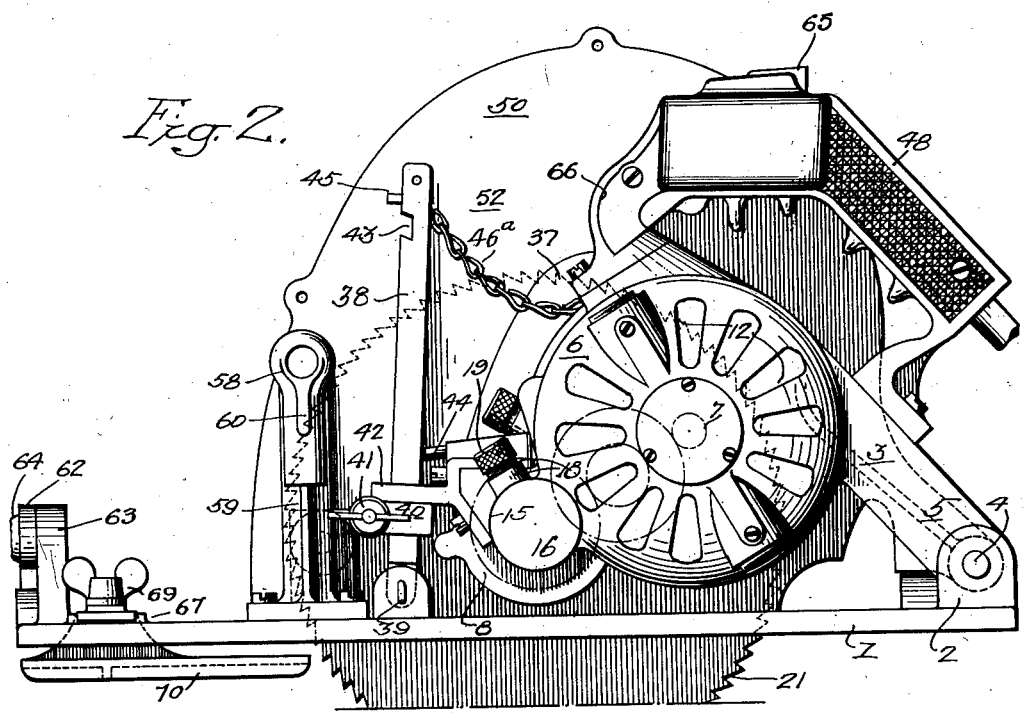

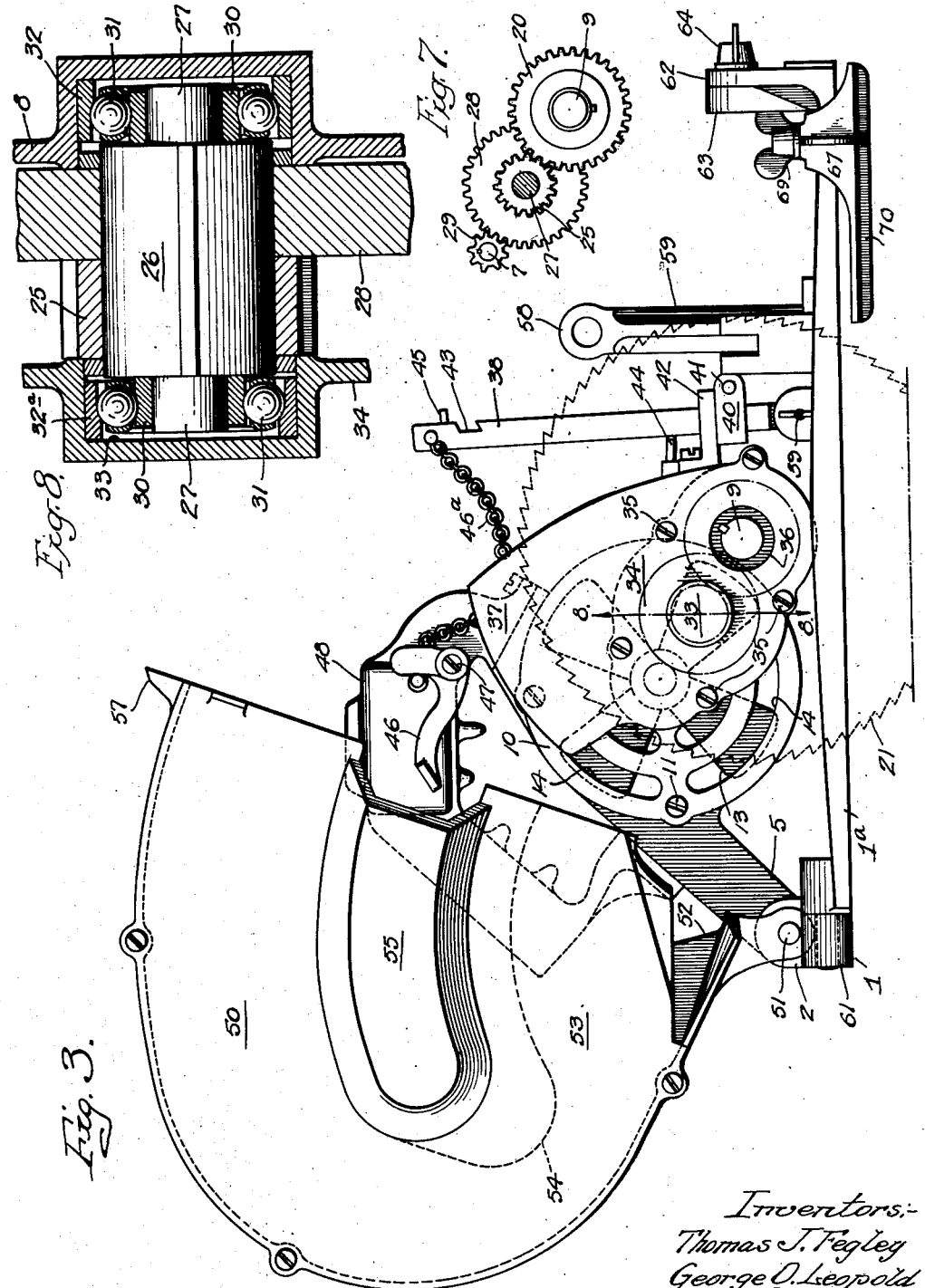

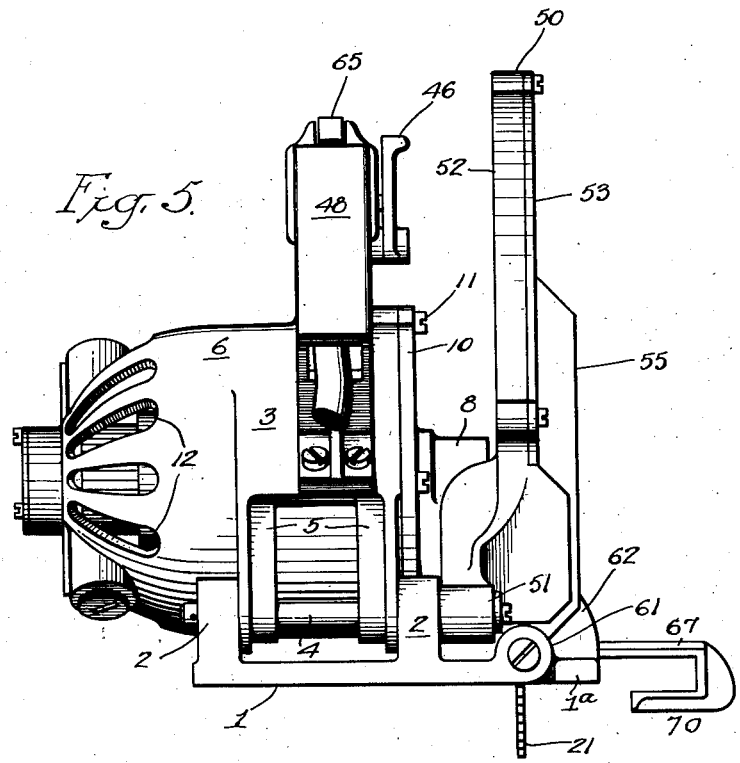
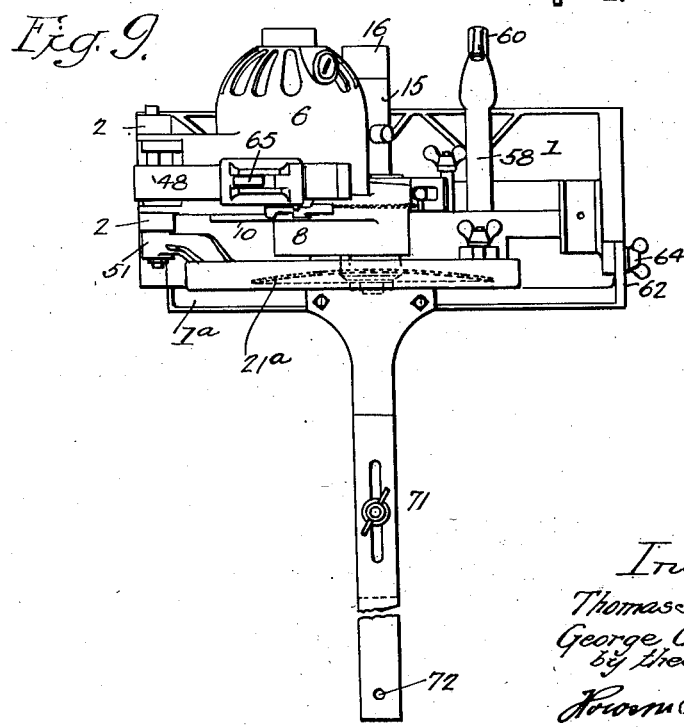

Patented May 19, 1931

1,806,528

UNITED STATES PATENT OFFICE

THOMAS J. FEGLEY AND GEORGE O. LEOPOLD, OF PHILADELPHIA, PENNSYLVANIA, ASSIGNORS TO NORTH BRO'S. M'F'G. CO., OF PHILADELPHIA, PENNSYLVANIA, A CORPORATION OF PENNSYLVANIA

PORTABLE POWER-DRIVEN SAW

Application filed January 29, 1930. Serial No. 424,370.

Our invention relates to certain improvements in portable power driven saws, in which a circular saw is used, the power being derived from an electric motor.

One of the objects of our invention is to make a practical power driven saw which can be readily manipulated and which can be raised out of working position and into a case, or lowered into working position.

A further object of the invention is to provide a saw with two handles by which it can be steadied.

A still further object of the invention is to provide the saw with an insulated handle and to locate the release mechanism for the saw at the handle.

Other details of the invention will be fully described hereinafter.

In the accompanying drawings:

Fig. 2 is a side view looking towards the back of the saw with the guard lowered;

Fig. 3 is a side view looking at the front of the saw with the guard raised;

Fig. 4 is an end view looking towards the forward end of the saw;

Fig. 5 is a rear end view of the saw;

Fig. 7 is a detached view showing the gearing;

Fig. 8 is a sectional view showing the intermediate spindle and its bearings; and Fig. 9 is a diagram illustrating one use of the invention.

Figure 1:
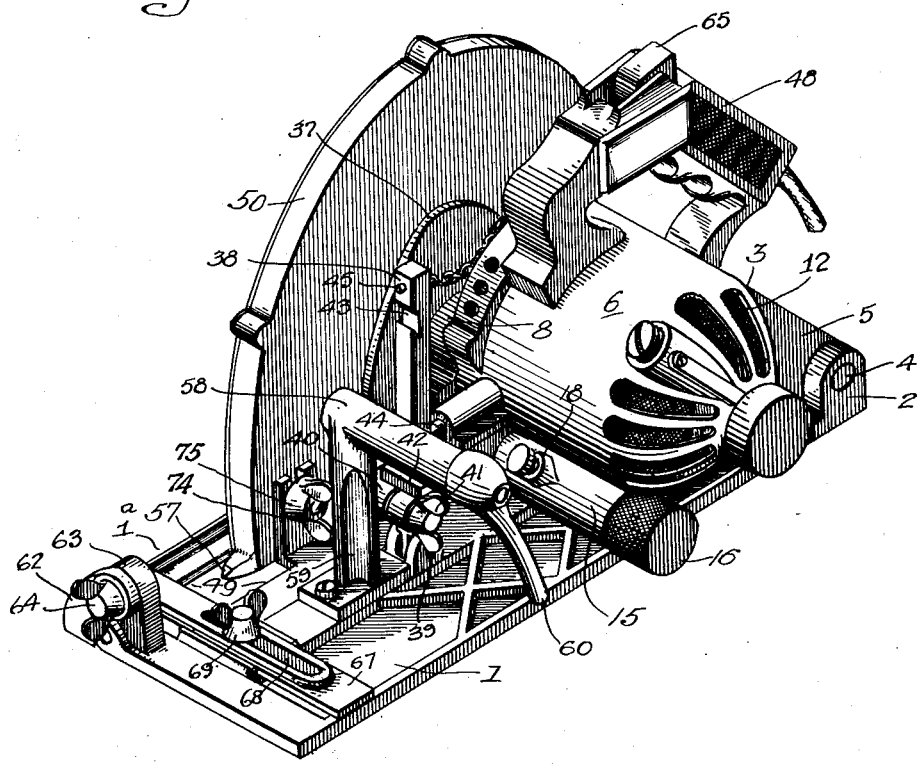
Fig. 1 is a perspective view of our improved portable power driven saw.
Figure 6:
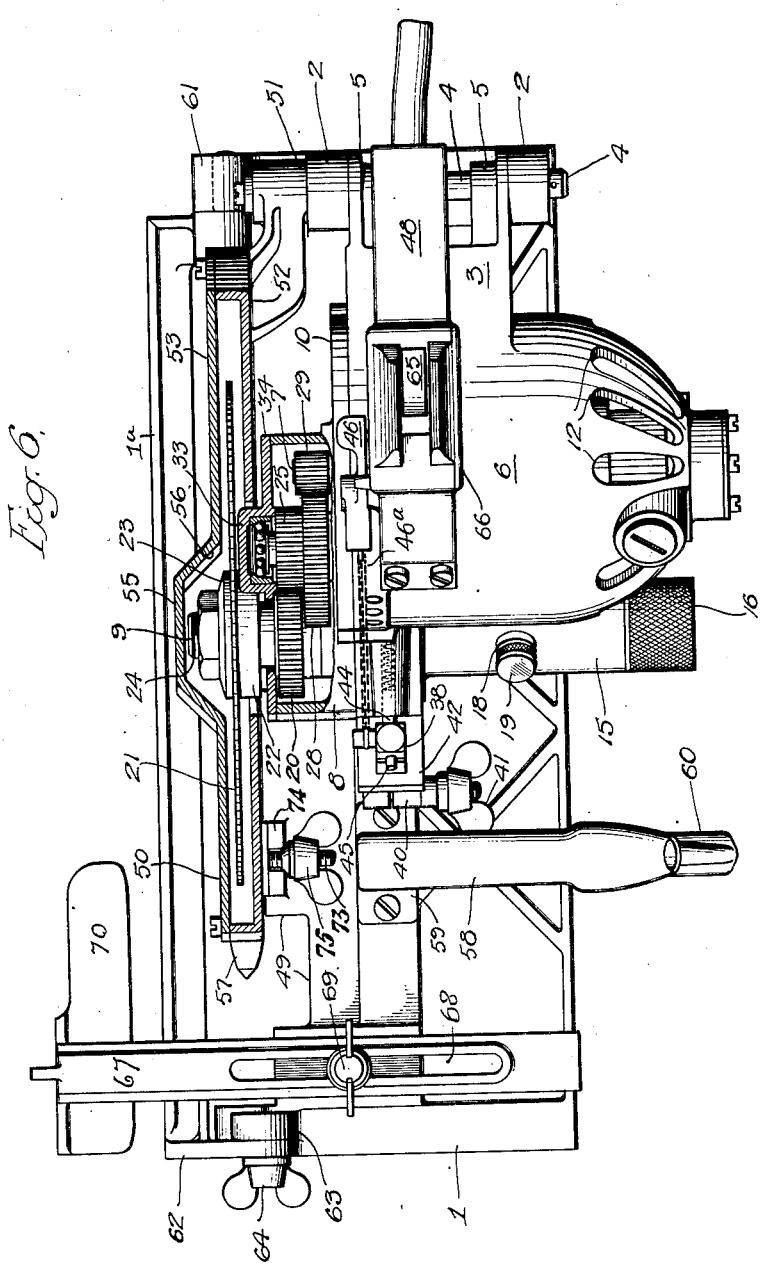
Fig. 6 is a plan view partly in section.

Referring to the drawings, 1 is the base plate of the portable saw, having projecting lugs 2 at the rear end, to which is pivoted the saw and motor-carrying frame 3 by a pivot pin 4. The frame 3 has two arms 5 which extend between the two lugs 2. The frame has a projecting casing 6 which encloses the electric motor by which the saw is driven. The motor is of any suitable type and is not shown in detail as it forms no part of the present invention. 7 is the motor shaft. 8 is a housing which encloses the gearing between the motor shaft 7 and the saw-spindle 9, and within this housing are the bearings for the several shafts. The housing has a flange 10. The flange is slotted at 14 and encloses a rotating fan 13 which is mounted on the motor shaft for the purpose of cooling the motor. The flange is secured to the frame 3 by screws 11. At the rear end of the motor casing 6 are slots 12, which allow the air currents to pass through the motor casing.

The saw-spindle 9 is mounted in an elongated bearing 15 at one side of the casing 6, as shown in Figs. 1 and 2. The bearing is closed by a cap 16, and within this cap is an adjusting collar 17 mounted on the rear end of the spindle 9. 18 is an opening for admitting grease to the bearing 15, and this opening is closed by a cap 19. On the forward end of the saw spindle 9 is a gear wheel 20, and beyond the wheel are the washers 22 and 23 which secure the saw blade 21 to the spindle. The circular saw 21 may be of any type, depending upon the material to be cut. The outer clamp-washer 23 has an internal screw-thread adapted to mesh with the thread 24 on the end of the spindle.

The teeth of the gear wheel 20, which is mounted on the spindle 9, mesh with an intermediate pinion 25 on a spindle 26 having reduced ends 27, Fig. 8. On this spindle is a gear wheel 28 which meshes with a pinion 29 on the motor shaft 7. On each reduced end 27 of the spindle 26 is an inner raceway 30 of a ball-bearing 31. The outer raceway 32 of the ball-bearing at the inner end of the spindle is mounted in the housing 8, while the outer raceway 32a of the ball-bearing is mounted in a recess 33 formed in a plate 34 secured to the housing by screws 35. The saw-spindle 9 extends through an opening 36 in this plate and the plate has a guard extension 37 which closes the elongated slot in a saw guard described hereinafter.

By the above construction the saw-spindle is driven at the proper speed from the motor shaft 7.

Means is provided to retain the saw frame 3 in its raised position so that the circular saw 21 will be above the base when not in use to prevent accidents to the operator, and means is also provided to adjust the saw to any depth desired. A bar 38 is pivoted to a lug on the base at 39 and is arranged to swing to and from the frame 3. On the bar is an adjustable stop 40, which is clamped to the bar by a clamp screw 41, the stop being split so that when the screw is tightened, it will draw the clamp tightly onto the bar and hold it in the position to which it is adjusted. This bar is preferably rectangular in cross-section.

On the frame 3 is a projection 42, which has a rectangular opening therein for the passage of the bar 38. At the upper end of the bar is a notch 43, which engages the projection and retains it in its raised position. Above the projection is a spring plunger 44 which tends to push the bar 38 outwards so as to make the engagement of the projection with the bar positive. Above the notch 43 is a stop 45 to limit the upward movement of the frame. The frame can be released from the bar by a trigger lever 46 pivoted at 47 to one side of the handle 48, which is attached to the frame 3. The short arm of this lever 46 is connected to the bar 38 by a chain or other connection 46a, so that on pressing down the lever the bar will be pulled away from the projection and the spring plunger will be depressed, releasing the frame.

50 is a saw guard which can be lowered into position, as shown in Fig. 1, so as to enclose the upper portion of the saw, the lower portion of the saw projecting through the slot 49 in the base when lowered. At the rear end of the guard is a hub 51, which is mounted in the present instance on the pivot pin 4 for the motor carrying frame 3, and is detachably secured to the base at its forward end by a clamp, in the present instance, consisting of a screw stud 73, which extends through a slotted projection 74 on the base, and on this stud is a thumb nut 75, so that on tightening the nut the saw guard is clamped rigidly to the base, but on backing off the nut, the guard is free to be turned on its pivot. The guard is hollow and has two side walls 52 and 53, which are spaced a sufficient distance apart to allow for the free movement of the circular saw. The side wall 52 is cut away at 54 to allow it to fit the projecting portions of the housing 8. The wall 53 of the guard 50 has a curved enlargement 55, back of which is a cavity 56, so that the guard will pass freely over the projecting portion of the saw-spindle and the clamp-washer. The cavity is of sufficient length to allow the saw to be elevated above the base 1. On the end of the guard is a projection 57 which is pointed as shown to indicate the center of the circular saw blade, so that when the guard is down and the saw is in position, the pointer can be seen through the opening 49 in the frame.

The handle 48, which is secured to the frame 3, is the main handle by which the saw is manipulated, and a hand-hold 58 is provided, which is located at the forward end of the saw and projects from the upper end of a standard 59, secured to the base 1. This hand-hold has a depending guard 60 at its outer end. When the operator is using the saw, he can hold the saw firmly by the two handles.

In some instances, where a routing cutter is used instead of a saw, the cutter of this type being much thicker than a saw, the space between the two side plates is increased, to allow clearance for the routing cutter.

Detachably secured to the cutting edge of the base 1 is an extension base 1a, which extends parallel to the edge of the base 1 on the outer side of the circular saw. This extension base has a pin at one end mounted in a bearing 61 on the base frame 1, and at the opposite end is a lug 62, which is clamped to a projection 63 on the base frame 1 by a clamp-screw 64. By this construction the extension base 1a is held firmly to the base but can be readily detached when necessary. The extension base supports the mechanism beyond the saw kerf, making the saw much easier to operate than when the support is on only one side of the saw kerf. This extension base can be removed and a wider extension base secured to the base frame, which can be pivotally mounted on the base and arranged to be adjusted to any angle desired, so as to cut bevels on the material being sawed. This construction is set forth and claimed in an application filed by us on the 7th day of December, 1929, under Serial No. 412,556.

A gauge 67 is mounted on the forward end of the base 1 and projects over the extension base 1a. The gauge is slotted at 68 and is held in the position in which it is adjusted by a clamp-screw 69. The gauge has a fence 70 which is designed to pass under the extension base 1a when desired.

The handle 48, by which the saw is manipulated, is made hollow, to receive the switch mechanism, which may be of any suitable form and this switch is controlled by a switch lever 65. This lever is in such position that it can be readily operated by the thumb, while the handle is grasped by the operator. The release lever is also positioned to be operated by the thumb. The handle is preferably made of a non-conducting material and has a cap plate 66 at one side, so that access may be readily had to the switch mechanism. The electric cable which is attached to the lower end of the switch has a tubular protector of rubber or other suitable material at the point where it enters the handle.

In order that the saw may be readily manipulated, the metallic parts of the structure are preferably made of aluminum, so that while the tool is strong, it is comparatively light. It will be understood that saws of this type are traversed over the material being cut and must be of as light weight as possible.

When it is desired to cut circular objects, a dished circular saw 21a is used as shown in Fig. 9, and a radius bar 71 is attached to the extension base 1a. The outer end of the radius bar 71 has a hole 72 therein on a line through the saw-spindle and through which a nail or other pivot can be driven, so that the machine can be traversed in a circular path. The radius bar is preferably made adjustable.

We claim:—

1. The combination in a portable power driven saw, of a base; a frame pivoted to one end of the base; an electric motor mounted on the frame, said motor having a shaft; a saw spindle having its bearings on the frame; gearing between the spindle and the shaft of the motor; a bar pivoted to the base; a projection on the frame encircling the bar; a stop on the bar located below the projection; means for clamping the stop in the position to which it is adjusted, said bar having a notch at its upper end, arranged to engage the encircling projection on the frame when the frame is raised to its full extent; yielding means on the frame tending to force the bar outwardly, so that the notched portion of the bar will engage the encircling member; a handle; a lever at the handle; and means connecting the lever to the bar, so that on the movement of the lever the bar will be moved away from the projection on the frame, which will free the pivoted frame from control of the bar.

2. The combination in a portable power driven saw, of a base; a frame, said frame having projecting lugs at the rear end; a saw and motor carrying frame; a pivot pin mounted in the lugs, to which the saw and motor carrying frame are pivoted; an independently movable guard for the saw, pivotally mounted on the pivot pin of the frame; and means at the forward end of the base for locking the guard in its closed position, encircling the saw.

3. The combination in a portable power driven saw, of a base; a frame pivotally mounted on the base; means for holding the frame in the raised position; a motor carried by the frame and a spindle also carried by the frame; bearings between the motor and the spindle; a housing secured to the frame and enclosing the gearing; a guard for the saw, pivotally mounted on the base at its rear end, the inner side wall of the guard being slotted to receive a projecting portion of the housing, the outer side wall having a curved enlargement back of which is a cavity to allow the guard to freely pass over a projecting portion of the saw spindle, the cavity being of sufficient length to allow the saw to be elevated above the base without disturbing the guard; and means for locking the guard in the closed position.

4. The combination in a portable power driven saw, of a base; a frame pivotally mounted on the base; means for holding the frame in its raised position; a motor carried by the frame, and a spindle also carried by the frame; gearing between the motor and the spindle; a saw guard pivotally mounted at the rear end of the base, beyond the frame, said guard being elongated so that the saw can be raised into the guard without disturbing the guard; and means for detachably securing the guard to the base.

5. The combination in a portable power driven saw, of a frame pivotally mounted on the rear end of the base; means for holding the frame in its raised position; a motor carried by the frame; a saw spindle also carried by the frame, and a saw thereon; bearings between the motor and the spindle; a saw guard also pivotally mounted at the rear end of the base some distance from the frame, the cavity of the saw guard being of sufficient length to accommodate the saw when the frame is raised; and a housing secured to the frame and extending to the guard, the inner wall of the guard being slotted to accommodate a projecting portion of the housing and the saw spindle, the housing having an extension which closes the elongated slot in the inner wall of the saw guard.

6. The combination in a portable power driven circular saw, of a base; a frame mounted on the base; a motor on the frame and a saw spindle having its bearings in the frame and geared to the shaft of the motor; an extension base detachably secured to the base at its cutting edge; and a radius bar secured to the extension base and having a pivot hole therein, the hole in the radius bar being in a line through the saw spindle.

THOMAS J. FEGLEY.
GEORGE O. LEOPOLD.